3,296,281
OXIDATION OF AROMATIC COMPOUNDS
Mack F. Hughes, Albany, Calif., assignor to Chevron Research Company, San Francisco, Calif., a corporation of Delaware
Filed Oct. 6, 1965, Ser. No. 493,338
11 Claims. (Cl. 260—346.4)

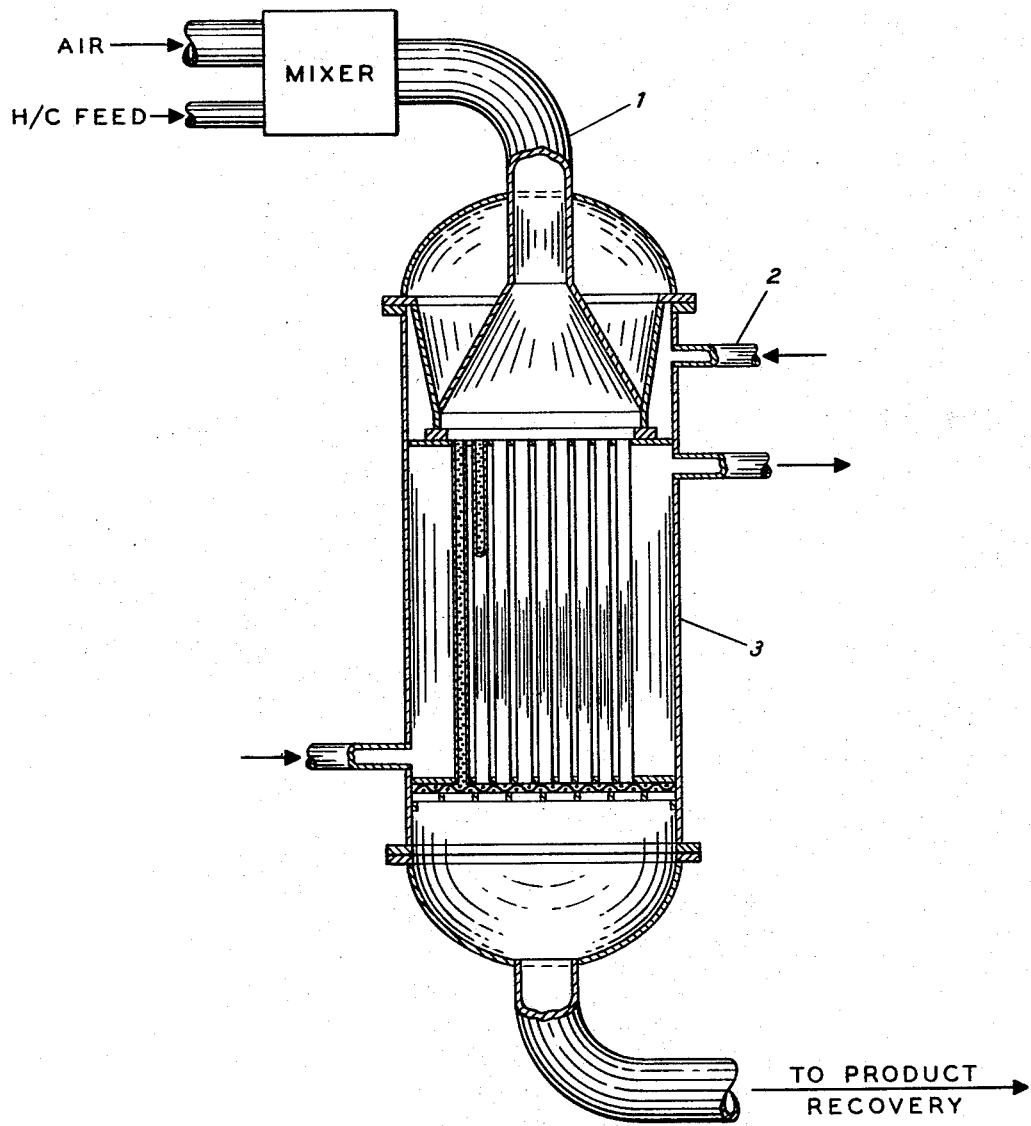

This invention relates to an improvement in vapor phase partial oxidations of certain aromatic hydrocarbons. More particularly it relates to an improvement in vapor phase oxidations for the production of organic acids and anhydrides in which the reaction is promoted by a metal oxide catalyst maintained in a shell-and-tube reactor.

Vapor phase oxidations of aromatic hydrocarbons are highly exothermic reactions. Efficient temperature control is a vital factor. In these reactions fixed-bed catalyst systems generally are employed because they afford markedly superior catalyst lives, and fewer mechanical problems relative to fluid bed systems. The foregoing factors and others usually cause selection of the multiple tube shell-and-tube type reactors as the means of choice.

Certain disadvantages, however, are experienced by the art with these reactors in that for more efficient operation preheated feed mixtures and very large bundles of tubes in large reactor shells are indicated by theory, but in practice much of the expected advantages are not appreciated. This follows because higher air to hydrocarbon feed ratios have been required than those normally useful for small reactors in order to avoid destructive so-called reactor-head explosions. Thus a reactor operating at a 30:1 ratio is only about two-thirds as efficient in terms of production as one operating at about a 20:1 ratio.

It has now been found that shell-and-tube oxidation reactors having diameters substantially in excess of 5 feet can be used as fixed bed catalytic vapor phase reactors for the partial oxidation of aromatic hydrocarbons of the formula $NR_x$ in which N is an aromatic nucleus having fewer than 3 carbocyclic aromatic rings, R is an alkyl group having fewer than two carbon atoms and $x$ can be 0, 1 or 2, employing air to hydrocarbon ratios in the range from about 12–25 to 1, respectively, in which the air and hydrocarbon are premixed and preheated to a temperature above about 400° F. but below a spontaneous ignition temperature, provided that the process is carried out using an operational feed factor, OFF, of at least above a value in the range from about 870–980. This factor is defined by the equation $$\text{OFF} = 100 \left[ \frac{15,000}{T+460} - \log (t_c - t_m) \right]$$

in which T is the temperature in degrees Fahrenheit of the mixture, $t_c$ is the time of first contact with the catalyst bed, $t_m$ is the time of mixing of the air and hydrocarbon (i.e., the difference is the pre-contact interval), and the time differential is in seconds. When fixed bed shell-and-tube oxidizers are operated in conformity with the foregoing expression wherein the OFF value is at least in the indicated range, reactor-head explosions are essentially eliminated, making possible greatly improved operation of the process under substantially reduced air to hydrocarbon feed mixture ratios.

The subject invention is particularly useful in the oxidations wherein there is required relatively high activation energies for the initial oxidative attack upon the feed compound such as benzene, and methyl substituted benzenes. For these feeds and the like, it is common and desirable practice to preheat the mixture above 400° F. before it is introduced into contact with the catalyst. It is during the interval between mixing and catalyst contact that explosions of the feed mixtures are experienced in the art and particularly where air to hydrocarbon ratios below about 28 to 1 are used.

The foregoing operational feed factor requirement or test is not to be applied in a gross sense as where average values for the gross feed stream are inserted into the expression. The requirement is a differential one, since if even a relatively micro portion of the feed stream has an operating factor less than a satisfactory value in the contemplated system, explosions can and do occur. It appears that only very small fractions of the total feed stream which have experienced the undesirable time-temperature relationship defined above (i.e., with an OFF value below a certain minimum) are capable of detonating air-hydrocarbon mixtures having weight ratios in the range from about 12–25 to 1, respectively. In view of the foregoing surprising discovery, it becomes clear that the present invention can be further described as a process wherein the air-hydrocarbon feed mixture proceeds in a flow essentially free of eddies and quasi-stagnant areas, through the reactor-head of a vapor phase reactor.

In a preferred embodiment of this invention essentially stream-line or laminar flow of the preheated air-hydrocarbon feed stream through the reactor head (cf. figure attached) is obtained by extending the vapor feed line through the reactor head in the configuration of an inverted truncated cone. The lower extension of the cone is not attached to the upper tube sheet but bears upon a metal O-ring type gasket which is interposed between the terminus of the vapor delivery line and the tube sheet as shown (figure). To complete the seal air at a pressure sufficiently in excess of the internal reactor-head pressure to provide a gas seal is introduced at Tap 2 as shown in the figure.

In a reactor as shown, figure, having a diameter of about 12 feet, charged with a fixed bed vanadium pentoxide catalyst, and fed about a 20 to 1 air to o-xylene mixture preheated to about 500° F. before introduction into the reactor proper and operated as described above, phthalic anhydride can be produced without interfering head explosions. Everywhere in the process feed stream the above defined OFF value is above about 980, provided, of course, the value for the direct line introduction (see figure) is also above 980. This is a matter, clearly, of the temperature, flow rate, and distance between the premix point and the point of introduction of the mixture into contact with the catalyst.

On the other hand, in the absence of the stream-line flow, for example, where no gasket and purge air means or the equivalent is employed, head explosions are the rule rather than the exception when air to hydrocarbon ratios are below about 25 to 1 in the contemplated super-reactors.

By shell-and-tube oxidation reactor is meant, in general, reactors having a multiplicity of tubes. These tubes are of limited size, in general less than about 3 inches in diameter, in order that the high reaction heat can be satisfactorily removed.

By vapor phase fixed bed oxidation catalyst is meant solid metal oxide vapor phase oxidation catalysts in general, whether disposed upon an inert solid support or not. The present invention is an improvement in the art and does not include catalyst development. Consequently, the catalysts mentioned are merely representative such as in addition to vanadia previously listed, chromia, molybdena, magnesia, nickel oxide, mixtures of oxides and the like.

Representative aromatic hydrocarbon feeds useful in the instant process include such compounds as benzene, o-xylene, naphthalene (i.e., precursors for the production of organic acid anhydrides). Others include toluene from which benzoic acid is produced, as well as m- and p-xylene and the like in a vaporized feed mixture which may also include ammonia from which cyano-substituted benzenes such as isophthalonitrile may be produced.

In general, the oxidation reactors contemplated in the invention are those having diameters in the range from about 5 to 20 feet. Reactor head explosion problems become more severe as the reactor diameter is increased. Thus, in particular, the present invention is useful for reactors in the 10–20 feet diameter range and larger.

The following example is illustrative only and is not intended to be limiting.

*Example 1*

A shell-and-tube oxidation reactor having a diameter of about 12 feet, containing about 12,000 tubes having a diameter of ¾ inch, was charged with a silicon carbide supported vanadium pentoxide catalyst. To the reactor was fitted a hemispherical head as shown (figure) except that no delivery line extension gasket means was employed. The reactor and catalyst charge was indirectly heated and maintained at a temperature of about 900° F. by a fluid heat exchange medium which was circulated through the reactor shell. Air and o-xylene were preheated to about 500° F., premixed thoroughly to produce a vapor having about 28 parts of air per part of o-xylene, and passed via the delivery line into contact with the catalyst bed. Phthalic anhydride was efficiently produced in the reactor and recovered.

The air to hydrocarbon ratio was then gradually reduced. At about a ratio of 25 to 1 an occasional detonation of the mixture in the reactor head and feed line was experienced. As the ratio was further decreased, the explosion frequency rapidly increased. The calculated operational feed factors in the above runs where explosions occurred were less than 980.

*Example 2*

As in Example 1 o-xylene was oxidized to phthalic anhydride except that the reactor head was modified to provide essentially stream-line flow as shown in the figure. The modification essentially precluded semi-stagnant, i.e., slower flow, and eddy conditions from developing in the vapor feed. Since the above modificatin also created a void zone within the head, it was fitted with a small entry port for the introduction of air at a pressure somewhat in excess of the reaction system pressure in order to insure the vapor seal at the gasket.

Air and o-xylene introduction was commenced and run as before. No head explosion problem was found at air-hydrocarbon ratios of 25 to 1, 20 to 1, and 17 to 1. No problem is anticipated at 15 to 1 and even at about 12 to 1 on the basis of developed theory. The calculated operational feed factors for all of the explosion-free runs were greater than about 980.

*Example 3*

A supported vanadium pentoxide, as in Example 1, was charged into a single tube shell-and-tube reactor. The vapor delivery line and the reactor tube had identical internal diameters, i.e., 0.709 I.D.; thus a stream-line flow condition was insured. The reactor and catalyst charge were heated and maintained at about 1000° F. by means of an indirect heat exchange means. Air and o-xylene in a weight ratio of 12 to 1, respectively, were thoroughly premixed, preheated to about 1070° F. and introduced into the catalyst bed via the delivery line. No head explosions or ignitions occurred under these conditions. The calculated OFF value for the run was greater than 980.

The foregoing examples demonstrate that vapor phase air oxidations in shell-and-tube type oxidation reactors can be carried out in super-dimensioned reactors and can be accomplished substantially free of reactor head explosions at air to hydrocarbon ratios substantially below 25 to 1 or even 15 to 1.

For the explosion-free operation of the present process, minimum satisfactory operational feed factors as above defined are in the about 870–980 range, and the value for a particular feed varies. For o-xylene about 980 is a satisfactory minimum; and for naphthalene, m- and p-xylene, the corresponding value is at least 870. Where mixtures of the contemplated hydrocarbon feeds are used, roughly intermediate values are desirable.

In the foregoing examples a single auxiliary air stream was used for the purge of semi-stagnant, or back-wash-like reactor head conditions. Depending upon the reactor head geometry, several or even a substantial number of air streams can also be employed and be advantageous. Similarly, rather than air, an inert gas such as nitrogen, carbon dioxide and the like can be advantageously used.

In the table following, for the several hydrocarbon feed compounds are listed temperatures and corresponding increments of time for that feed. These time values are upper limit values for the pre-contact interval, and this information is representative of temperatures and time values which will provide the permissible operational feed factor, OFF, values of the subject process. As a reasonable first approximation, linear extrapolations can be employed, although, of course, the algebric OFF value equation above is not a linear relationship. Such an extrapolation may be convenient in some circumstances as a guide where, for example, a particular super shell-and-tube reactor experiences reactor head explosions whenever operation in the explosive region is attempted. Thus, although both the time and temperature variables or one of them may be difficult to determine, the values in the table should serve to readily identify the unsatisfactory operational condition.

TABLE.—OPERATIONAL FEED FACTOR PARAMETERS

| Compound | T, ° F. | Δt |
|---|---|---|
| Benzene | 1,050 | 17 |
| Toluene | 1,100 | 8 |
|  | 1,000 | 38 |
|  | 1,100 | 8 |
| m- and p-Xylene | 990 | 44 |
|  | 1,100 | 8 |
| o-Xylene | 880 | 25 |
|  | 900 | 17 |
|  | 1,000 | 3 |

In view of the foregoing particular solution to the reactor-head explosion problem and aided by the aforedescribed functional description of the invention, other mechanical solutions should be obvious to the man skilled in the art. While only the circular shell type reactor has been alluded to in the foregoing description, other reactor shell dimensional configurations are clearly analogous and not intended to be excluded from the scope of the following claims.

I claim:

1. In a partial oxidation process in which a vaporized hydrocarbon is mixed with air, preheated to a temperature above about 400° F. and passed into contact with a fixed-bed, vapor phase, metal oxide, oxidation catalyst maintained at an oxidizing temperature in a shell-and-tube reactor having a shell diameter greater than about 5 feet, the improvement which comprises premixing said air and hydrocarbon at a weight ratio in the range from about 12–25 to 1, respectively, while maintaining the operational feed factor of said mixture prior to contact with said catalyst at a value greater than about 980, said factor being defined by the expression $$\text{Operational Feed Factor} = 100 \left[ \frac{15{,}000}{T+460} - \log t \right]$$

wherein $T$ is the temperature in degrees Fahrenheit, and $t$ is the pre-contact interval in seconds of said mixture, said hydrocarbon being of the formula $NR_x$ in which $N$ is an aromatic nucleus having fewer than three aromatic carbocyclic rings, $R$ is an alkyl group having fewer than 2 carbon atoms and $x$ is zero or an integer less than 3.

2. Process of claim 1 wherein said ratio is in the range from about 17–21 to 1, respectively.

3. The process of claim 1 wherein said reactor is at least 10 feet in diameter, said feed factor is greater than about 980 and R of said formula is methyl.

4. The process of claim 1 wherein said feed factor is greater than about 870 and said hydrocarbon is selected from the group consisting of benzene, toluene, naphthalene, m-xylene and p-xylene.

5. In a process for the production of phthalic anhydride from o-xylene in which vaporized o-xylene is mixed with air, preheated to a temperature above about 400° F. and passed into contact with a fixed-bed, vapor phase, metal oxide, oxidation catalyst maintained at an oxidizing temperature in a shell-and-tube reactor having a shell diameter greater than about 5 feet, the improvement which comprises premixing air and o-xylene in a weight ratio in the range from about 12–25 to 1, respectively, while maintaining the operational feed factor of said mixture prior to contact with said catalyst at a value greater than about 980, said factor being defined by the expression $$\text{Operational Feed Factor} = \left[\frac{15,000}{T+460} - \log t\right]$$

wherein T is the temperature in degrees Fahrenheit, and $t$ is the pre-contact interval in seconds of said mixture.

6. Process of claim 5 wherein said reactor is at least 10 feet in diameter and said ratio is in the range from about 17–21 to 1, respectively.

7. In a partial oxidation process in which a vaporized hydrocarbon is mixed with air and passed into contact with a fixed-bed, vapor phase, metal oxide, oxidation catalyst maintained at an oxidizing temperature in a shell-and-tube reactor having a shell diameter greater than about 5 feet, the improvement which comprises premixing said air and hydrocarbon at a weight ratio in the range from about 12–25 to 1, respectively, passing said mixture through the reactor head into contact with said catalyst, said hydrocarbon being of the formula $RN_x$ in which N is an aromatic nucleus having fewer than three aromatic carbocyclic rings, R is an alkyl group having fewer than 2 carbon atoms and $x$ is zero or an integer less than 3, and wherein one or more auxiliary air streams are used to purge the head of said reactor thereby minimizing semi-stagnant conditions therein.

8. The process of claim 7 wherein said reactor has a diameter of at least 10 feet and said ratio is in the range 17–21 to 1, respectively.

9. Process of claim 8 wherein an inert gas is used for said purge.

10. In a process for the production of phthalic anhydride in which a naphthalene or o-xylene feed is vaporized and mixed with air, preheated to a temperature above about 400° F. but below the spontaneous ignition temperature, and passed into contact with a fixed-bed, vapor phase, metal oxide, oxidation catalyst maintained at an oxidizing temperature in a shell-and-tube reactor having a shell diameter greater than about 5 feet, the improvement which comprises premixing air and said hydrocarbon at a weight ratio in the range from about 15–25 to 1, respectively, and passing said mixture into contact with said catalyst, and wherein one or more auxiliary air streams are used to purge the head of said reactor thereby minimizing semi-stagnant conditions therein.

11. Process of claim 10 wherein an inert gas is used for said purge.

References Cited by the Examiner

UNITED STATES PATENTS 2,510,803   6/1950   Cooper _____ 260—346.4

NICHOLAS S. RIZZO, *Primary Examiner.*

UNITED STATES PATENT OFFICE
CERTIFICATE OF CORRECTION

Patent No. 3,296,281 January 3, 1967

Mack F. Hughes

It is hereby certified that error appears in the above numbered patent requiring correction and that the said Letters Patent should read as corrected below.

Column 5, line 21, for "Operational Feed Factor=[" read -- Operational Feed Factor=100[ --.

Signed and sealed this 26th day of September 1967.

(SEAL)
Attest:

ERNEST W. SWIDER
Attesting Officer

EDWARD J. BRENNER
Commissioner of Patents